United States Patent
Stenfort

(10) Patent No.: US 8,122,298 B2
(45) Date of Patent: Feb. 21, 2012

(54) METHODS AND SYSTEMS FOR CAPTURING ERROR INFORMATION IN A SATA COMMUNICATION SYSTEM

(75) Inventor: Ross J. Stenfort, San Jose, CA (US)

(73) Assignee: LSI Corporation, Milpitas, CA (US)

(*) Notice: Subject to any disclaimer, the term of this patent is extended or adjusted under 35 U.S.C. 154(b) by 923 days.

(21) Appl. No.: 12/138,315

(22) Filed: Jun. 12, 2008

(65) Prior Publication Data
US 2009/0313527 A1    Dec. 17, 2009

(51) Int. Cl.
*G06F 11/00* (2006.01)

(52) U.S. Cl. ........ 714/48; 714/42; 714/43; 714/44; 714/49; 714/53; 714/54; 714/56

(58) Field of Classification Search ......... 714/42, 714/43, 44, 48, 49, 53, 54, 56
See application file for complete search history.

(56) References Cited

U.S. PATENT DOCUMENTS

| | | | |
|---|---|---|---|
| 6,961,813 B2* | 11/2005 | Grieff et al. | 711/112 |
| 7,003,617 B2* | 2/2006 | Golasky et al. | 710/315 |
| 7,360,119 B1* | 4/2008 | Stenfort et al. | 714/43 |
| 7,739,432 B1* | 6/2010 | Shaw et al. | 710/74 |
| 2003/0236953 A1* | 12/2003 | Grieff et al. | 711/151 |
| 2008/0086576 A1* | 4/2008 | Schauer | 710/5 |
| 2008/0215789 A1* | 9/2008 | Matsuda et al. | 710/308 |
| 2009/0234985 A1* | 9/2009 | Maxwell | 710/33 |
| 2009/0234994 A1* | 9/2009 | Oh et al. | 710/74 |

* cited by examiner

*Primary Examiner* — Robert Beausoliel, Jr.
*Assistant Examiner* — Joshua P Lottich
(74) *Attorney, Agent, or Firm* — Duft Bornsen & Fishman LLP

(57) ABSTRACT

Methods and systems for capturing error information regarding a Serial Advanced Technology Attachment (SATA). An initiator device is enhanced in accordance with features and aspects hereof to detect an error condition in operation of the system and to transmit error information to the SATA target device during a soft reset condition applied to the SATA target device. The SATA target device discards all such frames received during the soft reset condition until the initiator device clears the soft reset condition. The error information may be captured for further analysis and debug of the error condition by suitable error analyzer equipment such as a SATA bus analyzer. The initiator device may be a SATA initiator or a Serial Attached SCSI (SAS) initiator using the SATA Tunneling Protocol (STP). Features and aspects hereof may also include a SAS/SATA bridge device coupling a SAS initiator to the SATA target device.

19 Claims, 2 Drawing Sheets

METHODS AND SYSTEMS FOR CAPTURING ERROR INFORMATION IN A SATA COMMUNICATION SYSTEM

BACKGROUND

1. Field of the Invention

The invention relates generally to management of Serial Advanced Technology Attachment (SATA) system and more specifically relates to methods and structure for capturing error information regarding operation of a SATA device for evaluation by analytical devices.

2. Related Patents

This patent is related to commonly owned U.S. patent application Ser. No. 11/644,549 entitled Serial Advanced Technology Attachment (SATA) and Serial Advanced Small Computer System Interface (SCSI) (SAS) Bridging" which is hereby incorporated by reference. This patent is also related to commonly owned U.S. patent application Ser. Nos. 08-0382 and 07-2480 filed herewith which are also hereby incorporated by reference.

3. Discussion of Related Art

Storage systems may incorporate any number of storage devices (e.g., disk drives, CDROMs, etc.) ranging from a single storage device in a personal computer or workstation to hundreds if not thousands of storage devices in large scale storage applications. SATA storage devices are popular as low cost devices that provide adequate performance for many storage applications. SATA protocols utilize a high speed serial link to transmit frames between an initiator device (such as a host system or storage controller) to a target device (such as a disk drive or other storage devices). The SATA frame exchanges include information relating to register values that were previously exchanged over a parallel bus structure (PATA).

SATA exchanges are often embedded within a Serial Attached SCSI (SAS) networks wherein one or more SAS initiators communicate via a network of zero or more intermediate SAS expanders to one or more target devices. Where the target devices are SATA devices, a SAS initiator may connect to the SATA target device such that the SATA protocol is embedded ("tunneled") within the SAS standards using the SATA Tunneling Protocol (STP).

Regardless of the connectivity to a SATA target device (i.e., direct attachment to a SATA initiator or attachment to a SATA initiator through a SAS network using the STP protocol) it is a challenge to debug errors that arise in processing of the SATA exchanges. The SATA protocols between an initiator and a SATA target device do not provide a mechanism to capture, display, or otherwise present to an engineer any useful error information beyond the SATA frames per se. Design or field engineers need such additional error information to evaluate or debug a detected problem in communications with a SATA target device. Though the initiator device may have useful information to aid in determining the underlying problem there is no standardized SATA protocol exchange to permit that information to be presented to the engineer. Thus it is an ongoing challenge to obtain useful information to identify and correct a problem in a SATA device coupled to an initiator device.

SUMMARY

The present invention solves the above and other problems, thereby advancing the state of the useful arts, by providing methods and systems for presenting error information as frames on the SATA communication medium for capture and evaluation by an engineer using a SATA bus analyzer or other data capture and analysis devices or techniques. Features and aspects hereof provide for asserting a soft reset conditions ("SRST") in a SATA frame such that all following frames until the soft reset condition is cleared will be discarded by the SATA target device. The discarded frames may contain any useful error information regarding the present state of the SATA target device and its recent communications with the initiator device.

In one aspect hereof, a communication system is provided. The system includes an initiator device and a Serial Advanced Technology Attachment (SATA) target device coupled by a communication medium. The initiator device is adapted to detect an error condition. The initiator device is further adapted responsive to detecting the error condition to initiate a soft reset condition on the SATA target device and to transmit SATA frames containing error information regarding the detected error condition to the SATA target device while the SATA target device is in a soft reset state.

Another aspect hereof provides a method for evaluating error conditions in a system including a SATA target device coupled to an initiator device. The method includes detecting an error condition and forcing the SATA target device into a soft reset condition. The method then sends error information from the initiator device to the SATA target device while the SATA target device is in the soft reset condition. The sent error information is then captured using an error analyzer to evaluate the error condition.

Yet another aspect hereof provides a system including a plurality of SAS storage controllers coupled to a SATA storage device through a bridge device. The bridge device is adapted to detect an error condition and, responsive to detecting the error condition, initiates a soft reset condition on the SATA storage device. The bridge device then transmits SATA frames containing error information regarding the detected error condition to the SATA target device while the SATA target device is in a soft reset state.

DETAILED DESCRIPTION OF THE DRAWINGS

Figure 1:
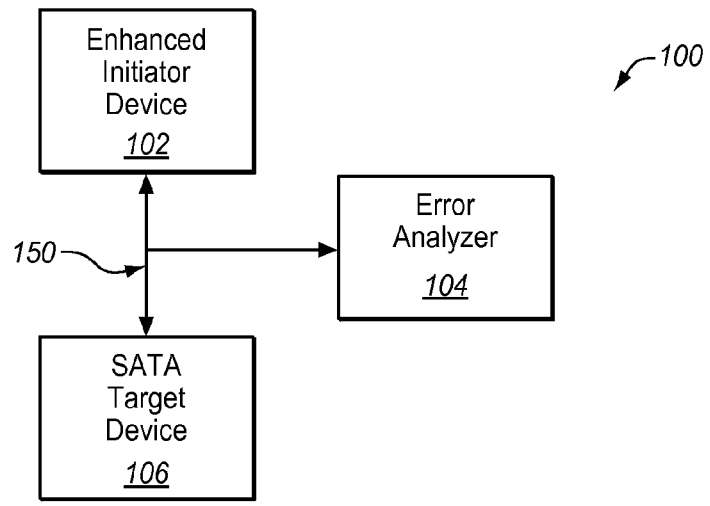
FIG. 1 is a block diagram of an exemplary system having an enhanced initiator device adapted to transmit error information to the SATA target device while the SATA target device is held in a soft reset condition in accordance with features and aspects hereof.

FIG. 1 is a block diagram of a system 100 including an enhanced initiator device 102 coupled to a SATA target device 106 through an appropriate serial communication link 150. Serial communication link 150 may be a suitable high speed serial link capable of transmitting SATA exchanges between the enhanced initiator device 102 and the SATA target device 106. Initiator device 102 may be, for example, a storage controller device in a larger storage subsystem 100 adapted for controlling one or more SATA target devices 106 (e.g., disk drives) within the storage subsystem 100. In addition, initiator device 102 may be a host bus adapter (HBA) integrated within a computing device such as a personal computer, workstation, server computing node, etc. Such a host bus adapter couples the computing system to one or more SATA target devices 106. SATA target device 106 may be, for example, a storage device such as a disk drive, CD ROM, or other common storage devices.

Error analyzer 104 may be coupled to communication medium 150 for purposes of monitoring and analyzing exchanges between initiator device 102 and SATA target device 106. Error analyzer 104 may be, for example, a bus analyzer and in particular a SATA bus analyzer adapted to capture and analyze SATA frames exchanged over the communication medium 150. Such bus analyzer devices are commercially available and well-known to those of ordinary skill in the art. Error analyzer 104 serves as a passive analyzer monitoring the exchanges on the communication medium 150 for presentation to an engineer for purposes of evaluating or debugging error conditions arising in the exchanges on medium 150.

As noted above, when an error condition is detected, the SATA protocols provide no particular mechanism to aid in debugging an error condition by revealing error status or error information that may be available within initiator device 102 or within SATA target device 106. Enhanced initiator device 102 is therefore adapted in accordance with features and aspects hereof to detect the presence of an error condition during its interaction with SATA target device 106. Responsive to detecting such an error condition, enhanced initiator device 102 is further adapted to force a reset soft reset condition in SATA target device 106. While held in the soft reset condition, SATA target device 106 will discard any transmissions received from the enhanced initiator device 102. Thus, in accordance with features and aspects hereof, while maintaining the soft reset condition of SATA target device 106, enhanced initiator device 102 transmits frames containing error information useful for an engineer to help diagnose or evaluate an error condition. The error information contained in the transmitted frames will be captured by error analyzer 104 to permit an engineer to evaluate and/or debug the error condition encountered.

The error information may include one or more exemplary components such as information regarding Cyclic Redundancy Check (CRC) error conditions, regarding contents of registers of the SATA target device 106, regarding status information regarding firmware operable within enhanced initiator device 102, or any other information potentially useful to an engineer to debug or evaluate a detected error condition.

Features of enhanced initiator device 102 may be implemented as custom firmware or circuitry within the enhanced initiator device 102. Such design choices will be readily apparent to those of ordinary skill in the art. Numerous additional elements and aspects of the enhanced initiator device 102 as well as SATA target device 106 present in a fully functional component will be readily apparent to those of ordinary skill in the art and are omitted from this discussion merely for simplicity and brevity.

Figure 2:
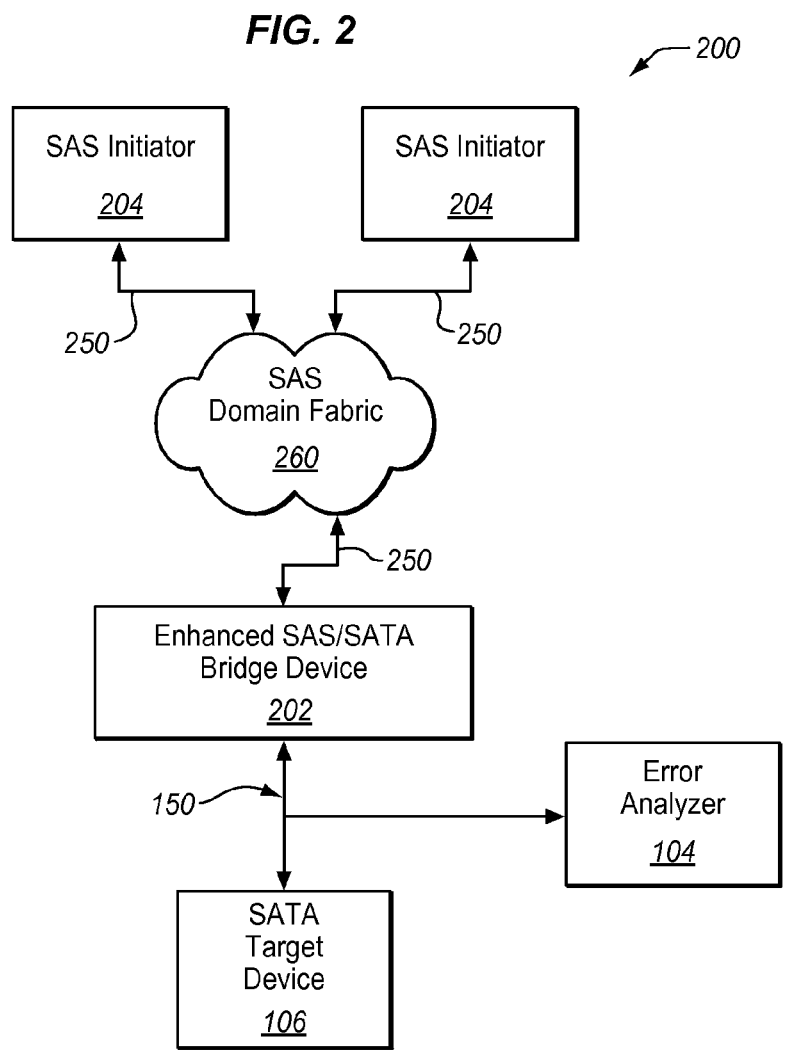
FIG. 2 is a block diagram of an exemplary system having an enhanced SAS/SATA bridge device coupling one or more SAS initiators to a SATA storage device and adapted to transmit error information to the SATA device while the SATA device is held in a soft reset condition in accordance with features and aspects hereof.

FIG. 2 shows another exemplary system 200 in accordance with features and aspects hereof adapted to transmit error information to a SATA target device 106 responsive to detection of an error condition. As above, the error information may be captured by an error analyzer 104 coupled to the high speed serial link (communication medium) 150 which is, in turn, coupled to SATA target device 106. In system 200 of FIG. 2, an enhanced SAS/SATA bridge device 202 provides the enhanced features and aspects hereof to detect an error condition and to force a soft reset condition on SATA target device 106 in response to the detected error. While holding the soft reset condition on SATA target device 106, enhanced SAS/SATA bridge device 202 may transmit error information useful to a design or field engineer to evaluate or debug the detected error condition. As generally taught by the related patent applications noted above, enhanced SAS/SATA bridge device 202 may communicate with one or more SAS initiator devices 204 through a SAS domain fabric 260. The SAS domain fabric 260 may include any number of SAS expander devices to allow coupling of multiple SAS initiators to the enhanced bridge device 202. Enhanced bridge device 202 and each SAS initiator 204 are coupled to the SAS domain fabric 260 through appropriate SAS communication links 250. The error condition detected by bridge device 202 may be errors in communications with the SATA target device 106, errors in communications with the SAS initiators 204, errors in communication with the SAS domain fabric 260, or any other error condition sensed in operation of system 200.

Those of ordinary skill in the art will recognize that bridge device 202 may present itself in the SAS domain (i.e., to the domain fabric 260 and/or to the initiators 202) as a device capable of accepting any SAS communication protocols including, for example, STP, Serial SCSI Protocol (SSP), and Serial Management Protocol (SMP). Bridge device 202 may therefore translate as required any SAS protocols into appropriate exchanges with SATA target device 206. Such features are discussed in further detail in the related patents incorporated herein by reference. Further, those of ordinary skill in the art will readily recognize additional and equivalents components present within a fully functional enhanced SAS/SATA bridge device 202 as discussed in the related patents. Such additional components are omitted from this discussion merely for simplicity and brevity.

Figure 3:
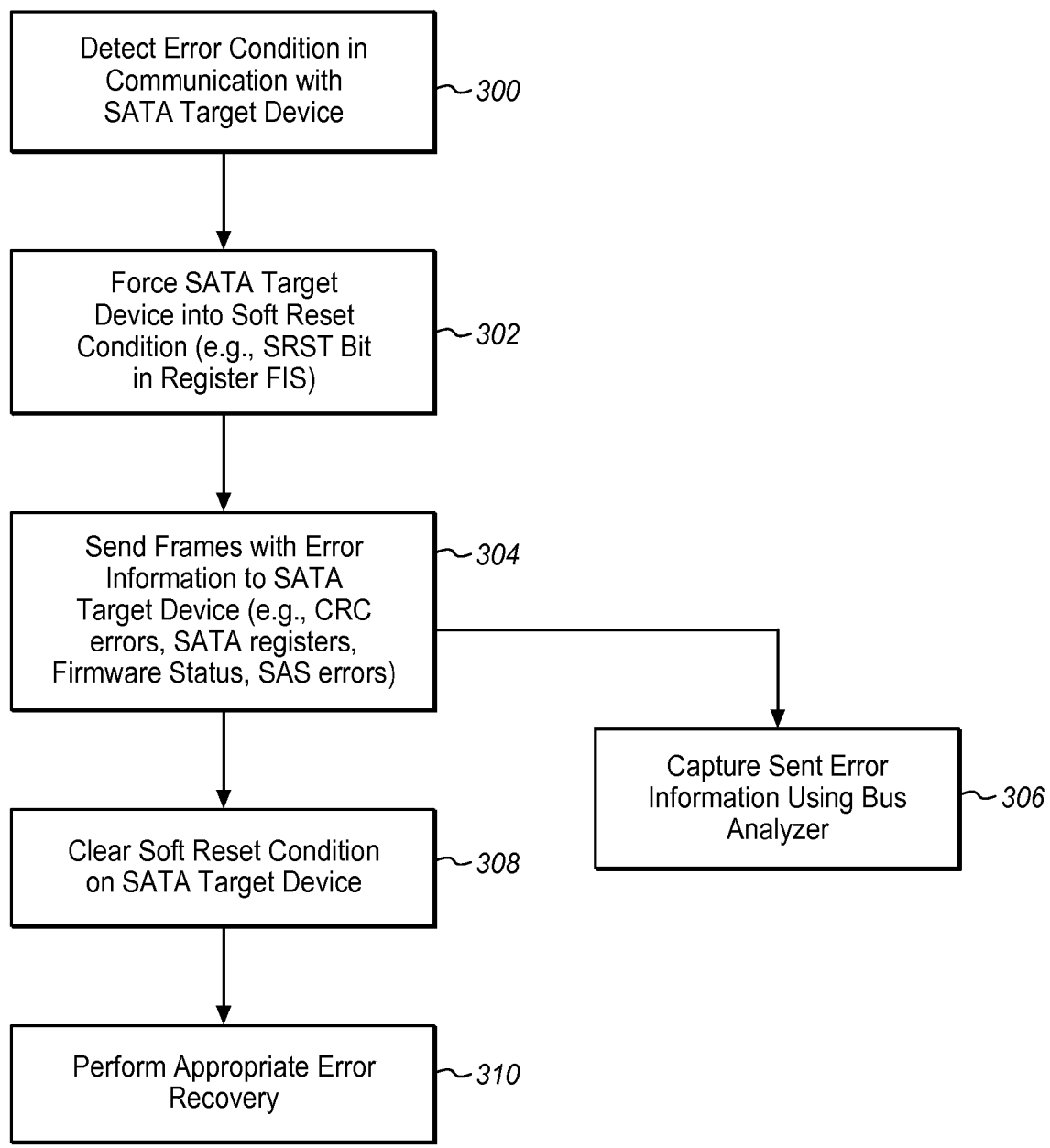
FIG. 3 is a flowchart describing an exemplary method in accordance with features and aspects hereof to force a SATA device into soft reset condition and to then transmit error information to the SATA device while the soft reset condition is held.

FIG. 3 is a flowchart describing an exemplary method in accordance with features and aspects hereof for providing error information useful for evaluation and debug of an error condition detected in communications with a SATA target device. The method of FIG. 3 may be performed generally within an appropriate initiator device or bridge device as discussed above with respect to FIGS. 1 and 2. As noted further herein below, one step of the flowchart a FIG. 3 is performed by an external error analyzer device coupled to capture the error information generated by the method. Step 300 within the initiator/bridge device detects an error condition in its normal communication with an attached SATA target device. Responsive to detecting such an error condition, step 302, performed within the initiator/bridge device, forces the SATA target device into a soft reset condition. For example, the initiator/bridge device may generate a SATA Register Frame Information Structure (FIS) that includes the SRST bit set appropriately to cause the SATA target device to enter a soft reset condition. The generated FIS is transmitted from the initiator/bridge device to the SATA target device to initiate a soft reset condition therein. As is standard and specified for SATA devices, all subsequent received frames are discarded until an appropriate frame is received to clear the soft reset condition (i.e., a frame with the SRST bit appropriately reset).

While holding the SATA target device in the soft reset condition, step 304 within the initiator/bridge device next transmits one or more SATA frames in which error information is embedded. As noted above, the error information may include CRC errors, SATA register contents, status of firmware within the initiator/bridge device, etc. Where the initiator/bridge device communicates with other devices using SAS protocols (e.g., SSP, STP, or SMP), error information may also include errors detected in the SAS communication links. Further, those of ordinary skill in the art will recognize that any combination of such exemplary error information may be transmitted to the SATA target device while it is held in a soft reset condition. Still further, those of ordinary skill in the art will readily recognize numerous other examples of error information that may be useful for a design or field engineer to evaluate or debug an error condition detected in communications with the SATA device or, in the context of a SAS/SATA bridge device, detected in "upstream" communications with other SAS devices.

An appropriate error analyzer coupled to the communication link between the initiator/bridge device and the SATA target device may then capture the transmitted error information as indicated by step 306. Thus, step 306 is a step performed by an appropriate error analyzer as distinct from the rest o the steps of FIG. 3 performed within the initiator/bridge device.

Directing the reader now back to method steps performed within the initiator/bridge device, step 308 clears the soft reset condition on the SATA target device by transmission of an appropriately formatted SATA frame. Lastly, step 310 within the initiator/bridge device performs appropriate error recovery processing to handle the detected error condition of the SATA target device as appropriate for the particular application. Such normal error recovery processing may include completing other reset operations of the SATA device, informing any upstream host device drivers of the detected error condition, and performing any appropriate retries. Such normal error recovery processing is well known to those of ordinary skill in the art and details of such processing are omitted herein for simplicity and brevity of this discussion.

Those of ordinary skill in the art will recognize numerous equivalent and additional method steps that may be performed as a matter of design choice. Such additional and equivalent method steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A communication system comprising:
an initiator device;
a Serial Advanced Technology Attachment (SATA) target device; and
a communication medium coupling the initiator device to the SATA target device,
wherein the initiator device is adapted to detect an error condition, and
wherein the initiator device is further adapted responsive to detecting the error condition to initiate a soft reset condition on the SATA target device and to transmit SATA frames containing error information regarding the detected error condition to the SATA target device while the SATA target device is in a soft reset state.

2. The system of claim 1
wherein the initiator device is a SATA initiator device.

3. The system of claim 1
wherein the initiator device is a bridge device.

4. The system of claim 1
wherein the initiator device is a Serial Attached SCSI (SAS) initiator device using the SATA Tunneling Protocol (STP).

5. The system of claim 1
wherein the error information comprises one or more of:
Cyclic Redundancy Check (CRC) information,
SATA target device register contents,
Serial Attached SCSI (SAS) error information, and
firmware state information of the initiator device.

6. The system of claim 1
wherein the error information comprises:
information useful to an engineer for analyzing the detected error condition.

7. The system of claim 1
wherein the initiator device is further adapted to clear the soft reset condition on the SATA target device following transmission of the error information.

8. The system of claim 7
wherein the initiator device is further adapted to perform error recovery processing following clearing of the soft reset condition on the SATA target device.

9. A method for evaluating an error condition in a system including a Serial Advanced Technology Attachment (SATA) target device coupled to an initiator device, the method comprising:
detecting an error condition;
forcing the SATA target device into a soft reset condition;
sending error information from the initiator device to the SATA target device while the SATA target device is in the soft reset condition; and
capturing the error information using an error analyzer to evaluate the error condition.

10. The method of claim 9 further comprising:
clearing the soft reset condition of the SATA target device following sending of the error information from the initiator device to the SATA target device.

11. The method of claim 9
wherein the initiator device is a SATA initiator device.

12. The method of claim 9
wherein the initiator device is a bridge device.

13. The method of claim 9
wherein the initiator device is a Serial Attached SCSI (SAS) initiator device using the SATA Tunneling Protocol (STP).

14. The method of claim 9
wherein the step of sending error information further comprises one or more of the steps of:
sending information regarding Cyclic Redundancy Check (CRC) errors;
sending information regarding contents of register values associated with the SATA target device;
sending information regarding a Serial Attached SCSI (SAS) link used for transmissions to the SATA target device; and
sending information regarding the state of firmware operating within the initiator device.

15. The method of claim 9
wherein the step of sending error information further comprises:
sending information useful to an engineer for analyzing the detected error condition.

16. The method of claim 9
wherein the step of forcing further comprises:
sending a SATA Register Frame Information Structure (FIS) with the SRST bit set to force a soft reset condition.

17. A system comprising:
a plurality of Serial Attached SCSI (SAS) storage controllers;
a Serial Advanced Technology Attachment (SATA) storage device; and
a bridge device coupling the SAS storage controllers to the SATA storage device,
wherein the bridge device is adapted to detect an error condition, and
wherein the bridge device is further adapted responsive to detecting the error condition to initiate a soft reset condition on the SATA storage device and to transmit SATA frames containing error information regarding the detected error condition to the SATA target device while the SATA target device is in a soft reset state.

18. The system of claim 17
wherein the error information comprises one or more of:
SATA storage device register contents,
SAS error information relating to communications between the bridge device and one or more of the plurality of SAS storage controllers,
Cyclic Redundancy Check (CRC) information relating to communications between the bridge device and the SATA storage device or relating to communications between the bridge device and one or more of the plurality of SAS storage controllers, and
firmware state information of the bridge device.

19. The system of claim 17
wherein the bridge device is further adapted to clear the soft reset condition on the SATA storage device following transmission of the error information.

* * * * *